Figure 1:
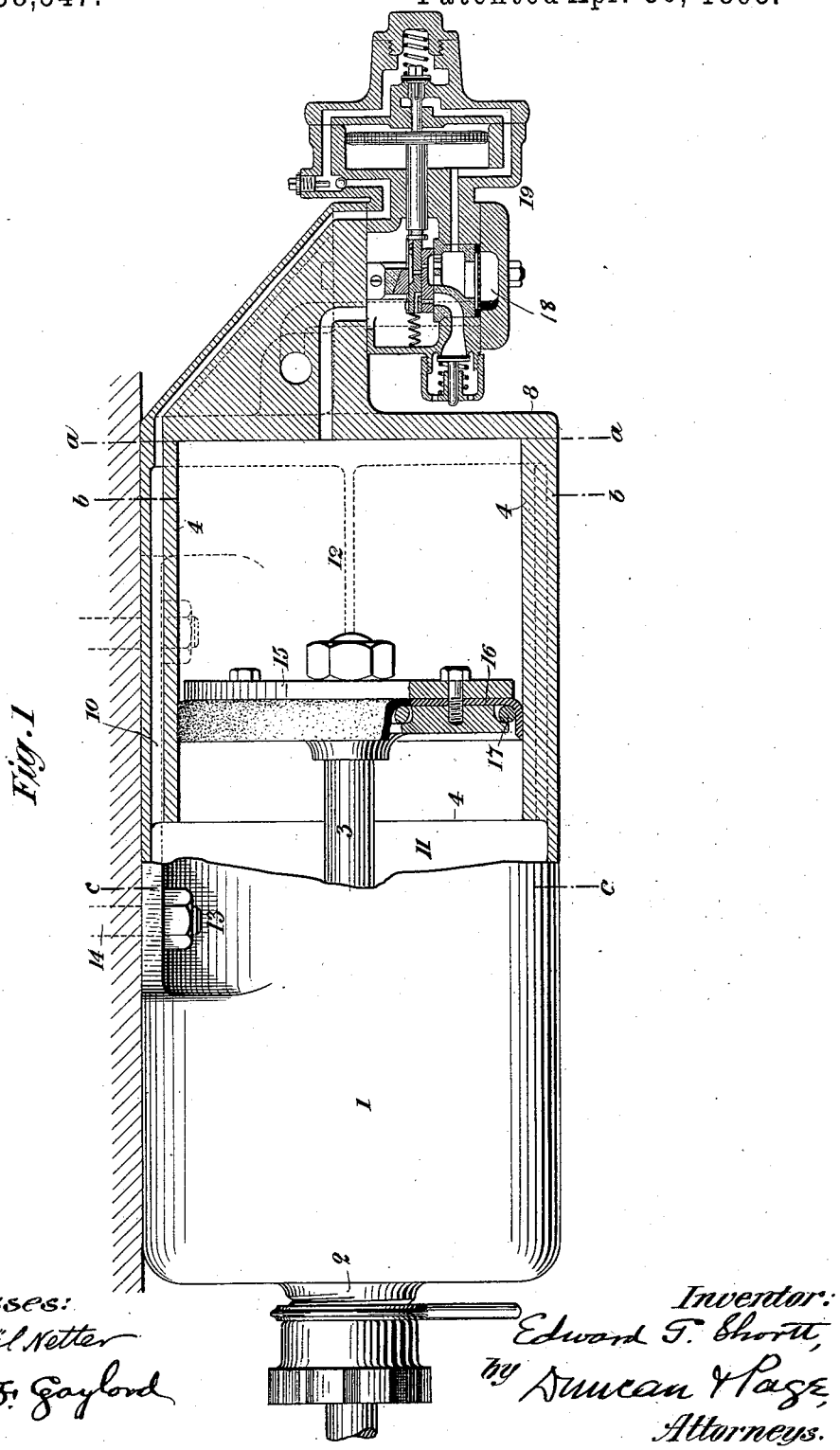

(No Model.)  2 Sheets—Sheet 1.
E. G. SHORTT.
AIR BRAKE CYLINDER AND RESERVOIR MECHANISM.
No. 538,547. Patented Apr. 30, 1895.

(No Model.) 2 Sheets—Sheet 2.
E. G. SHORTT.
AIR BRAKE CYLINDER AND RESERVOIR MECHANISM.

No. 538,547. Patented Apr. 30, 1895.

Witnesses:
Raphaël Netter
Robt. F. Gaylord

Inventor:
Edward G. Shortt,
by Duncan & Page,
Attorneys

UNITED STATES PATENT OFFICE.

EDWARD G. SHORTT, OF CARTHAGE, ASSIGNOR TO CHARLES GOODWIN EMERY, TRUSTEE, OF NEW YORK, N. Y.

AIR-BRAKE CYLINDER AND RESERVOIR MECHANISM.

SPECIFICATION forming part of Letters Patent No. 538,547, dated April 30, 1895.

Application filed October 13, 1894. Serial No. 525,783. (No model.)

*To all whom it may concern:*

Be it known that I, EDWARD G. SHORTT, a citizen of the United States, residing at Carthage, in the county of Jefferson and State of New York, have invented certain new and useful Improvements in Air-Brake Cylinder and Reservoir Mechanism, of which the following is a specification, reference being had to the drawings accompanying and forming a part of the same.

The present improvements relate especially to the construction of the brake-cylinder and local or auxiliary reservoir mechanism of an air-brake system.

In applying air brake mechanism to railroad cars an important feature of economy and space concerns the disposition and arrangement of the air brake cylinder on the car and of the local reservoir also carried thereon. This is especially true as to freight cars and platform and road-building cars, the latter often having floors which open downward for the purpose of depositing road material upon or through the track. It is therefore highly desirable, especially in the case of the class of cars last named, to have the brake cylinder and reservoir mechanism occupy as little working space as possible. In comparative sense, especially as to economy of construction, it is desirable to have the brake cylinders and local reservoirs of other cars as small and compact as possible, particularly to avoid special constructions of connection beween the brake cylinder and the reservoir, as well as the joints, leakage, &c., incident thereto.

It is the object of my invention to combine the brake cylinder and local reservoir in one structure. To this end, I propose to arrange the ordinary brake cylinder within a square or angular casing, the interior space of which casing, except that occupied by the cylinder, shall constitute the local reservoir space. By these means the local reservoir casing being square occupies practically the same working space, diametrically speaking, as the brake cylinder occupies, and the angular spaces between the reservoir shell and the cylinder serve to hold reservoir air. Speaking as to longitudinal length, this combined structure occupies much less working space than would the ordinary brake cylinder and its local reservoir occupy, if arranged end to end as is common.

The invention consists of features of construction which will be hereinafter particularly pointed out in the claims to follow the description and use, of my improved mechanism.

Figure 2:
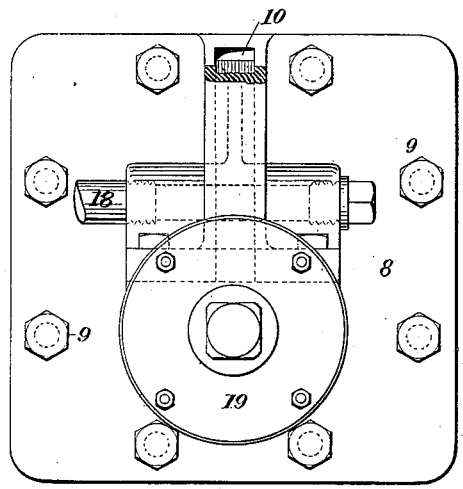
Figure 3:
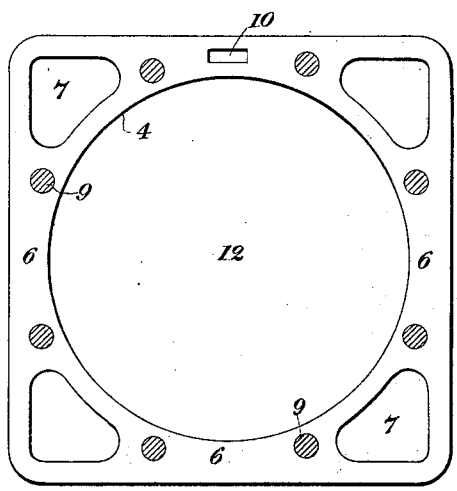
Figure 4:
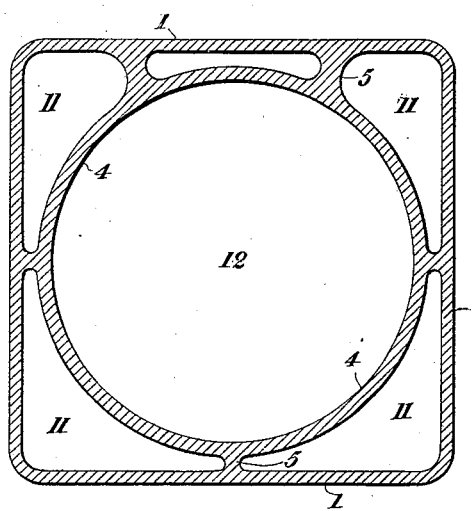
Figure 5:
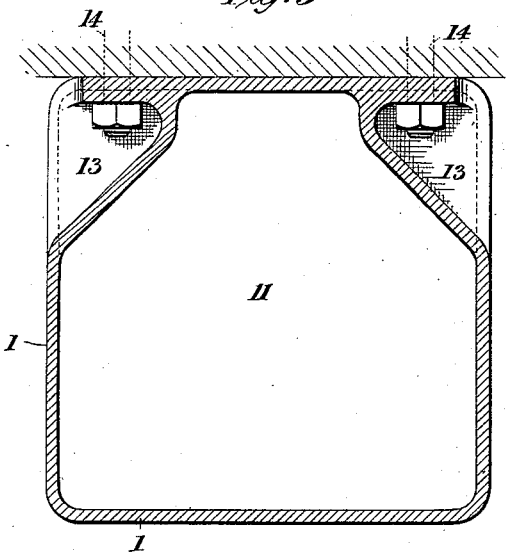

Referring to the drawings accompanying this specification, Figure 1 is a side longitudinal elevation view, in partial central section, of a brake cylinder and reservoir mechanism embodying my invention. Fig. 2 is an end elevation view from the right-hand end of Fig. 1. Fig. 3 is an end view of the casing as on plane $a\ a$, the valve mechanism at the right-hand end of Fig. 1 being shown as removed. Fig. 4 is a cross-section of the casing on the plane $b\ b$ and looking from the right-hand end of Fig. 1. Fig. 5 is a similar section on plane $c\ c$.

Referring to these views of drawings in detail, the numeral 1 represents the exterior shell of the casing. This shell is practically square in cross-section, and rectangular in shape lengthwise. Preferably, the structure would be of cast iron, although it may be otherwise made up. The end of the shell, including the stuffing box 2 of the brake piston rod 3, is shown as integral with the exterior casing.

4 is the brake-piston cylinder, which is cylindrical in form and the walls of which are of proper thickness—as shown herein, practically of the same thickness as the exterior or reservoir walls. This cylinder is fixed within the reservoir or exterior casing by the fins 5. In fact, it is proposed to cast the reservoir shell and the brake piston cylinder in one single piece, although the reservoir shell and brake piston cylinder may be constructed and attached to each other in two or more pieces. The right hand end of this combination structure is open as seen in Fig. 3, and the cylinder and reservoir shell are joined by webs 6 as shown, core spaces 7 being left to facilitate casting the structure, should it be so made.

8 indicates the cap plate which covers and

closes the reservoir shell, this cap plate being secured in place by bolts 9, the shanks of which enter threaded holes in the webs 6. An open passage 10 may also be made in this 5 structure, which passage extends from the reservoir space 11 to outside of the cylinder space 12—as to the local slide valve mechanism at the right hand end of Fig. 1.

Sockets 13 are formed in the sides of the 10 exterior shell, Figs. 1 and 5, the upper shell portion or base of the structure being continued horizontally, while for the purpose of forming these sockets the side walls of the structure are deflected or turned in. Bolts 15 14 serve to hold the structure in place to the body or other supporting part of the car. This combination of reservoir shell and brake piston may be employed in any air brake system irrespective of its method of operation, and 20 I do not therefore confine myself in the use of such a structure to any particular system of air brake mechanism. In the present case I have shown this combined reservoir and brake cylinder structure as adapted to an 25 equilibrio air brake system. In such a system 15 represents the brake piston, which is provided with a collapsible packing ring 16 held in place by a spring expansible ring 17, the flap of the packing being turned toward 30 the reservoir space and being free to lift to permit the fluid pressure to pass the same from the piston space 12 into the reservoir space 11, but closing down under reservoir pressure to prevent fluid in the reservoir space entering the brake piston space.

18 is the train pipe space which is in direct communication with the brake cylinder space, in case of this structure being used for an equilibrio brake.

40 19 represents a slide valve mechanism adapted to control the local exhaust from the train pipe and cylinder for the purposes of producing an application of the brakes, and also adapted upon suitable operation to transfer the reservoir fluid to the train pipe space as in the case of release of the brakes. This valve mechanism, however, is only intended to represent a type, since it may be substituted by other forms of valve mechanism. By these means I am enabled to utilize the angular spaces, 11, Fig. 4, about the cylinder as reservoir spaces, and this without increasing materially the lateral extent of the structure over that of the diameter of the cylinder; and, in proportion to the size of these angular spaces, I am enabled to shorten the main part of the reservoir, or that part thereof that it is found necessary to have in addition to such angular spaces.

I am aware that it has been proposed to place an air brake cylinder within an angular casing, to which casing, and for the purpose of operating the brake piston, it was proposed to admit air from an adjoining auxiliary reservoir. It is the purpose of my invention to utilize as an auxiliary reservoir an angular chamber containing the brake cylinder, whereby to avail for reservoir purposes of the angular spaces between the brake cylinder and the reservoir shell, so that the working space of the combined cylinder and reservoir structures will be reduced to the minimum in size, and to the least practicable working space.

What is claimed as new is—

In air brake mechanism, a reservoir structure of angular form in cross-section and normally holding air under pressure, and a cylindrical brake cylinder arranged at one end of and within and lengthwise of said reservoir with the angular spaces between the brake cylinder and that portion of the reservoir shell which surrounds it in free communication with the body of the reservoir, whereby said angular spaces are utilized to store reservoir air and the size of the combined cylinder and reservoir structure is correspondingly reduced, as set forth.

EDWARD G. SHORTT.

Witnesses:
JOHN UNSER,
H. B. EDMONDS.